Oct. 17, 1967

E. GERLACH

Re. 26,283

DEVICE FOR CONTROLLING THE IMAGE FREQUENCY DURING THE PROJECTION OF A MOTION PICTURE FILM

Original Filed May 29, 1962

3 Sheets-Sheet 1

United States Patent Office

Re. 26,283

Reissued Oct. 17, 1967

26,283

DEVICE FOR CONTROLLING THE IMAGE FREQUENCY DURING THE PROJECTION OF A MOTION PICTURE FILM

Erwin Gerlach, Tyreso, Sweden, assignor, by mesne assignments, to Eastman Kodak Company, Rochester, N.Y., a corporation of New Jersey Original No. 3,165,251, dated Jan. 12, 1965, Ser. No. 198,528, May 29, 1962. Application for reissue Jan. 3, 1967, Ser. No. 613,059

21 Claims. (Cl. 226—50)

Matter enclosed in heavy brackets [ ] appears in the original patent but forms no part of this reissue specification; matter printed in italics indicates the additions made by reissue.

*ABSTRACT OF THE DISCLOSURE*

*A film feeding mechanism for a projector wherein a film claw moves longitudinally along the film at a constant frequency with electrically actuatable means for moving the film claw into and out of engagement with the film. Switch means is provided in the circuit connected to the electrically actuatable means for moving the film claw into and out of engagement with the film at any selected one of a plurality of different frequencies.*

Figure 1:
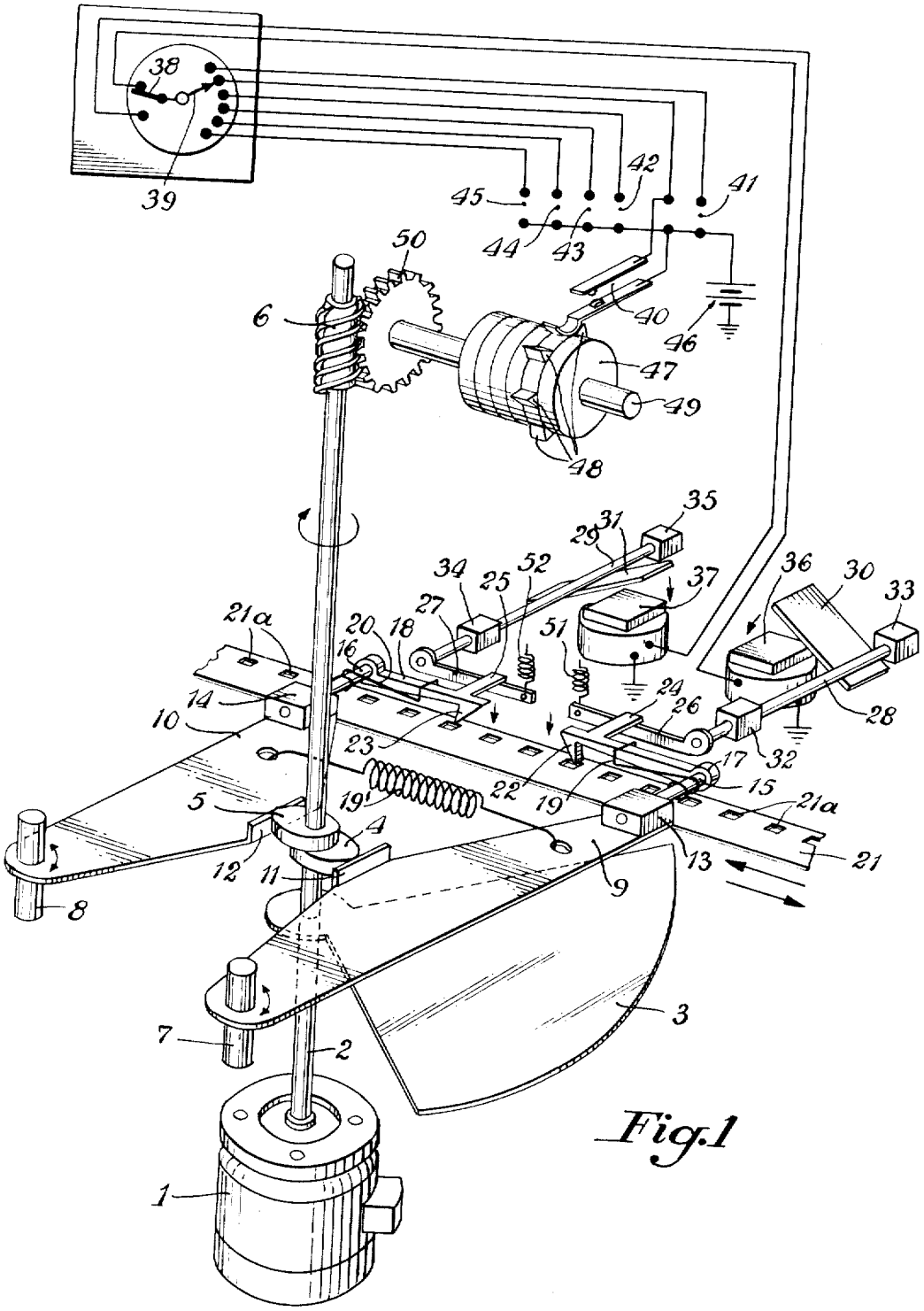

This invention relates to a device for controlling the image frequency during the projection of a motion picture film. The movement of the motion picture film is effected by a claw which performs a periodical longitudinal movement with constant frequency and during each $n^{th}$ longitudinal movement period is caused to selectively move in a direction perpendicular to the plane of the film for the purpose of engaging the film perforations, whereby n=0, 1, 2, 3, etc.

It is an object of the invention to simplify the construction of the film advancing device in that the periodically moved claw of the film advancing device is associated with an electromagnet which controls the movement of the claw perpendicular to the plane of the film.

It is another object of the invention to arrange in the energizing circuit of the electromagnet a control switch which in dependence of the advancing movement of the claw is being opened and closed.

With these and other objects in view, the invention will now be described in connection with a specific embodiment which is illustrated in the accompanying drawing, wherein, however, there are shown only those parts which are required for an understanding of the invention, while other parts which do not form an essential part of the invention have been omitted.

Figure 2:
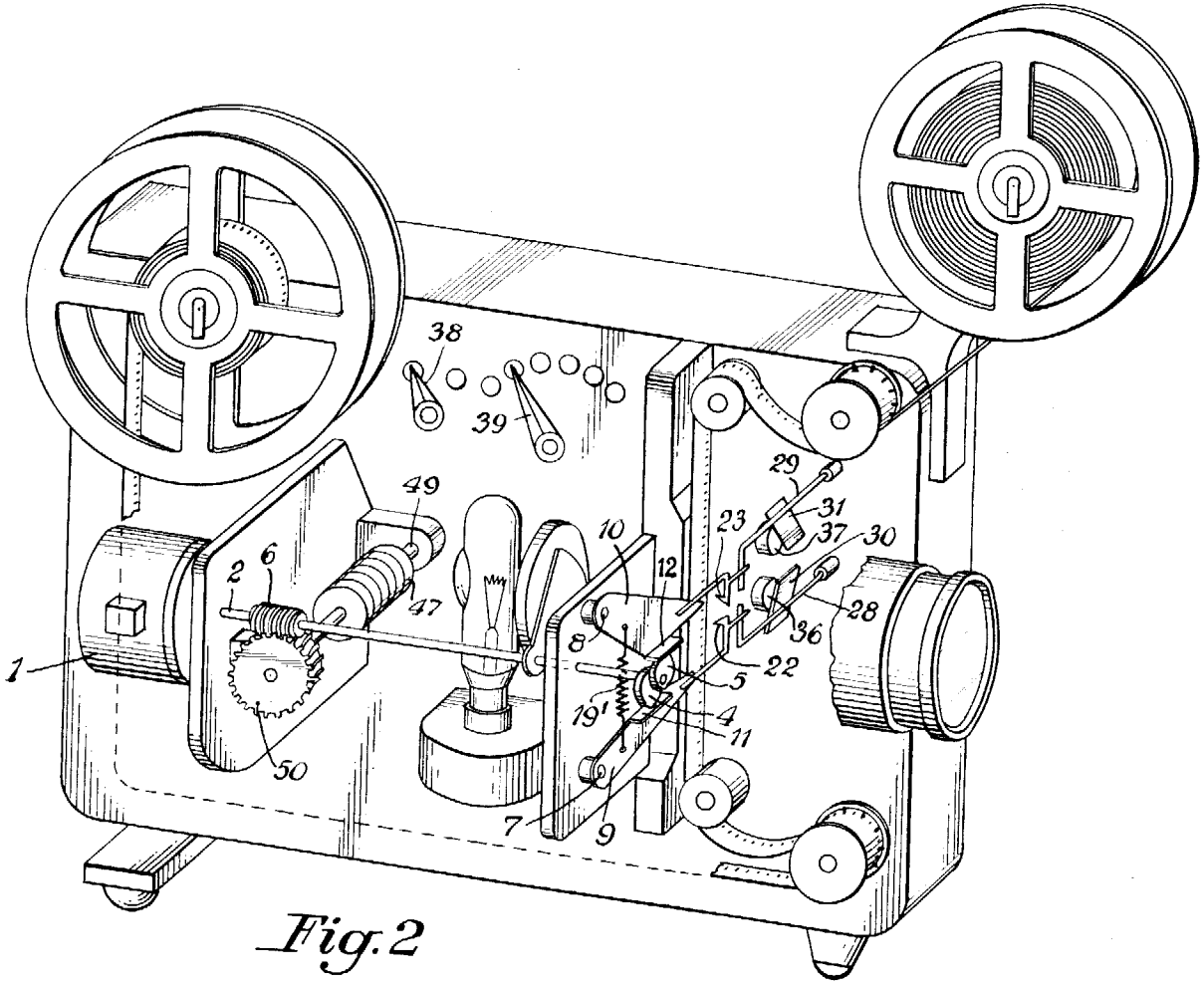
Figure 3:
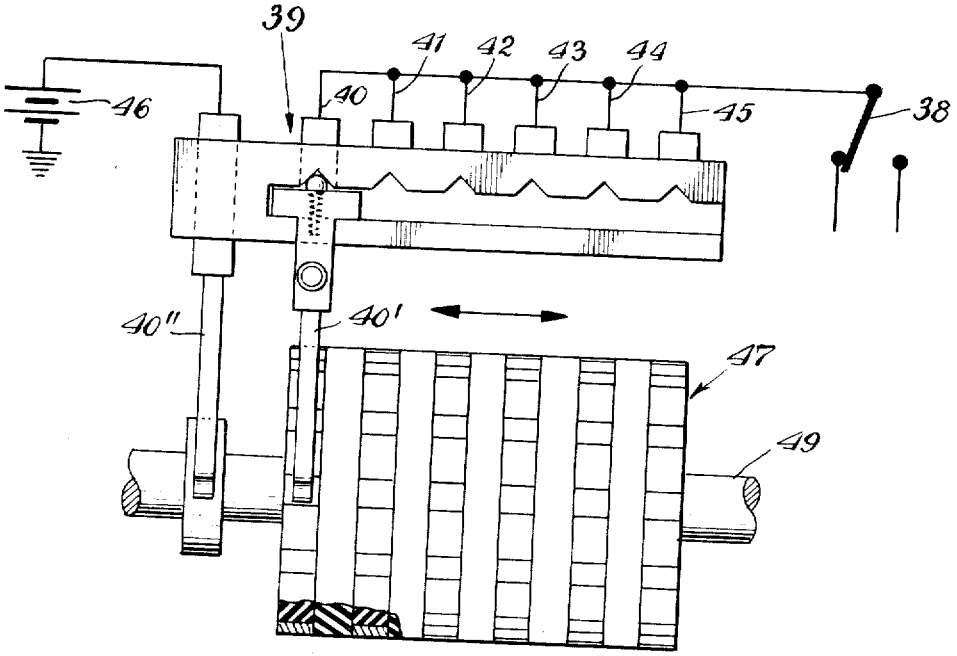
Figure 4:
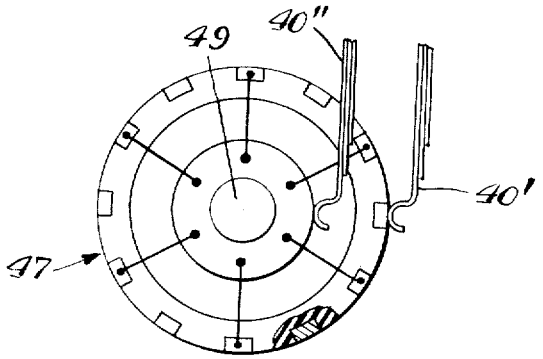

In the drawing:

FIGURE 1 is a perspective view, partly illustrating diagrammatically the device of the invention, FIGURE 2 illustrates a motion picture projector which is equipped with the device of the invention, FIGURE 3 illustrates a modified control drum adapted to be used with the invention, and FIGURE 4 is an end elevation view of the modified control drum.

Referring to the drawing and particularly to FIGURE 1, the electric motor 1 drives a shutter shaft 2 to which is fixedly attached a shutter blade 3, two eccentrics 4 and 5 and a worm gear 6. Two guide levers 9 and 10 are pivotally mounted with one of their ends to stationary pivot pins 7 and 8 and are provided intermediate their ends with flanges 11 and 12 which are caused to be held in constant engagement with the circumferences of the eccentrics 4 and 5 by means of a coil spring 19' connected with its ends to the levers 9 and 10, respectively. The free ends of the guide levers 9 and 10 have mounted thereon bearing blocks 13 and 14 in which are mounted outwardly extending pivot rods 15 and 16 pivotally supporting the claws 17 and 18 which are arranged at right angles with respect to their supporting rods 15 and 16 and extend lengthwise of the film 21. The claws 17 and 18 which are rotatably mounted on the pivot rods 15 and 16 are subjected to the action of torsion springs 19 and 20 which in the shown embodiment of the invention are arranged on the pivot rods 15 and 16 between the bearing blocks 13 and 14 and the respective claws 17 and 18. The action of the torsion springs 19 and 20 is such that they try to rotate the claws 17 and 18 toward the motion picture film 21 for engaging one of the perforations therein. The outer ends of the claws 17 and 18 are provided each with a tooth 22 and 23 and adjacent of these teeth is arranged a horizontally extending projection 24 and 25 which are in engagement with one-armed levers 26 and 27. Each one-armed lever 26, 27 is fixedly attached to one end of shafts 28, 29 which are fixedly attached thereto between their ends the magnetic plates 30 and 31. The shafts 28 and 29 are rotatably supported in axially spaced bearing blocks 32, 33 and 34, 35 respectively. The free ends of the one-armed levers 26, 27 are subjected to the action of tension springs 51 and 52 which tend to move the levers 26 and 27 upwardly in such a manner that the magnetic plates 30 and 31 are caused to be moved away from the electro-magnets 36 and 37. The force of the springs 51 and 52 is such that the action of the torsion springs 19 and 20 is overcome. The magnetic plate 30 is associated with the electro-magnet 36 and the magnetic plate 31 is associated with the electro-magnet 37. Both electro-magnets 36 and 37 may be connected selectively by a double throw switch 38 and a selector switch 39 and one of a number of switches 40, 41, 42, 43, 44 and 45 with a source of current 46. The double throw switch 38 and the selector switch 39 are manually operated. The control switches 40 to 45 are arranged within the operating range of control cams arranged on a control drum 47. For the sake of simplicity and an easier understanding of the invention, the drawing illustrates only the control switch 40 and the control cams 48 cooperating therewith. The number of the control cams which are associated with the individual control switches is not illustrated, however, the number is different on each control switch. The control drum 47 is fixedly mounted on a shaft 49 which also has fixedly mounted thereon a worm gear 50 which meshes with the gear worm 6 on the motor driven shaft 2.

The operation of the device of the invention is as follows:

The motor 1 drives continuously the shutter shaft 2 with the shutter blade 3 thereon, the eccentrics 4 and 5 and the worm gear 6. As a result the guide levers 9 and 10 are continuously moved back and forth about the pivot pins 7 and 8 so that the film advancing device is periodically moved back and forth. As long as the two electro-magnets 36 and 37 remain de-energized, the lateral projections 24 and 25 on the claws 17 and 18 slide back and forth along the top edges of the one-armed levers 26 and 27 without causing an engagement of the teeth 22 and 23 with the perforations 21a in the motion picture film 21. When the double throw switch 38 and the selector switch 39 are in the illustrated position, an electric circuit containing the source of current 46 may be closed by means of the control switch 40, the selector switch 39, the double throw switch 38 and the electro-magnet 37 and back to the source of current 46. The closing of the control switch 40 is effected by one of the cams 48 on the control drum 47 which is driven by the worm gear 6 and the worm gear 50 mounted on the shaft 49. Since now the electro-magnet 37 will be energized, the magnetic plate 31 will be attracted by this electro-magnet and will cause a rotative movement of electro-magnet and will cause a rotative movement of the shaft 29. The magnetic plates 30 and 31 never touch the electromagnet but remain at a distance therefrom. As a result, the one-armed lever 27 is lowered and also the projection 25 on the claw 18 is lowered and this results in a tensioning of the spring 52. At the same time the tooth 23 on the claw 18 enters into one of the perforations 21a of the film 21 so that the film 21 is moved a distance equal to one frame by the guide lever 10 which is moved by the eccentric 5 on the shaft 2. In FIGURE 1, the motion picture film 21 will be moved toward the left and this may be considered the forward movement of the film. At the end of this movement which is a distance of one frame of the film the control cam 48 will have passed the control switch 40 which now opens, the electro-magnet becames de-energized and releases the magnetic plate 31 so that now the shaft 29 rotates quickly and the one-armed lever 27 jumps upwardly under the action of the spring 52 into the initial position. During this movement the tooth 23 on the claw 18 is raised from the perforation in the film and the latter stops its movement. Depending upon the number of the cams 48 within the range of the control switch, the tooth 23 will either not engage at all the perforations 21a of the film 21, or in order to move the film 21, it will engage the perforations 21a at each swinging period of the levers 9 and 10, or at every other swinging period of the levers 9 and 10, and so on.

In order to move the film backwardly, i.e. from the left hand side to the right hand side in FIGURE 1, it is necessary to change the position of the double throw switch 38. When this is done, the electromagnet 36 will be energized and the magnetic plate 30 rotates the shaft 28 anti-clockwise. The one-armed lever 26 tensions the spring 51 so that the claw 17 with its extension 24 and its tooth 22 is moved downwardly under the action of the torsion spring 19. The control operation is performed by means of the same elements as heretofore. Accordingly, the invention provides means for moving the film 21 backwardly and the picture frequency during this backward movement may be changed as often as desired and this may take place during the projection of the images of the film onto the screen.

Since the double throw switch 38 and the selector switch 39 may be easily accommodated in a remote control unit, the device of the invention may be easily changed to a projection of a film which is remotely controlled.

It is also possible to employ in place of the plurality of control switches 40 to 45 a single control switch 40' (FIGURE 3) which would have to be arranged slidably along the control drum 47 in order to perform at the same time the function of a selector switch.

Finally, it is also possible by means of other elements, for instance as shown in FIGURES 3 and 4 by means of a commutator and slide contact, to produce the impulse for the electro-magnet in dependence of the conveying movement of the claw.

What I claim is:

1. In a device for controlling the image frequency during the projection of a motion picture film, claw means adapted to be moved periodically lengthwise of the film and to be moved selectively perpendicular with respect to said film for entering into a perforation of said film during selected longitudinal movements of the same, motor driven shaft means, a pivoted guide lever arranged to swing in the same plane as said film to which said claw means is pivotally attached, a cam on said shaft means engageable with said guide lever for moving said claw means periodically in a direction lengthwise of said film, a lever arm engageable with said claw means for periodically moving said claw means into and out of engagement with a perforation of said film, an electro-magnet arranged in an electric circuit having a source of electrical energy for actuating said lever arm, said electro-magnet being connected selectively to a selector switch in said circuit, a plurality of circuits for said selector switch each of which contains a normally open control switch, a cam carrying drum having a series of circumferentially spaced members engageable with said control switches for closing one of said selective control switches periodically, said cam carrying drum being operated by said motor driven shaft means, said claw means and lever arm being positioned in closely spaced relation to said film and arranged substantially parallel therewith.

2. In a device for controlling the image frequency during the projection of a motion picture film, two selectively operable claws adapted to be moved periodically lengthwise of the film, one for the forward movement and one for the backward movement of the same, motor driven shaft means, a pair of pivoted levers arranged to swing in the same plane as said film, one of said two claw means being pivoted on the free end of each pivoted lever to swing about an axis normal to the direction of film movement, yielding spring means for urging said claws downwardly, actuating means on said shaft means engageable with said pivoted levers for moving said claws periodically lengthwise of said film, means for selectively and pivotally moving said claws perpendicular to said film for periodic engagement with a perforation in said film, said last named means including two electro-magnets, a circuit for each electromagnet having a source of electrical energy, there being one electro-magnet for the forward movement and one electro-magnet for the backward movement of said film, each of said electromagnets being connected in said circuit and adapted to be selectively connected by a double throw switch with an electric circuit containing a selector switch which has connected thereto a plurality of circuits each one of which contains a normally open control switch, the latter being alternately opened and closed, a cam carrying drum which is rotated by said motor driven shaft means, said drum having projections on said cams for engaging said control switch and closing said circuit to energize said electromagnet and move said claw means into a perforation in said film.

3. In a device for controlling the image frequency during the projection of a motion picture film, claw means adapted to be moved periodically lengthwise of the film and to be moved selectively perpendicular with respect to said film for entering into a perforation of said film during selected longitudinal movements of the same, a motor driven shaft extending in a direction perpendicular to said film, a guide lever adjacent said shaft movable in a plane parallel to said film, a cam on said shaft engageable with said guide lever for moving said claw means periodically lengthwise of said film, an actuating lever adjacent said claw means, yielding spring means for urging said claw means downwardly in engagement with a perforation of said film, yielding spring means for urging said claw means and actuating lever upwardly away from said film, an electro-magnet for actuating said actuating lever and claw means, an electric circuit for said electro-magnet, said electro-magnet being adapted to be connected selectively by a selector switch in said circuit, a plurality of circuits connected to said selector switch each of which contains a control switch, a cam carrying drum operated by said motor driven shaft, said cam carrying drum being provided with a plurality of sets of circumferentially spaced cams arranged one set next to the other, the cams of each of said sets being engageable with one of the control switches in said circuits to open and close a selected control switch of said plurality of circuits whereby one series of cams at a time is selected by said selector switch to be connected with its associated control switch in said circuit of said electro-magnet.

4. In a device for controlling the image frequency during the projection of a motion picture film, claw means adapted to be moved periodically lengthwise of the film and to be moved selectively perpendicular with respect to said film for entering into a perforation of said film during selected longitudinal movements of the same, a motor driven shaft, a guide lever movable in a plane parallel with said film, a cam on said shaft for moving said claw means periodically lengthwise of said film, means for periodically moving said claw means into and out of engagement with a perforation of said film, said last named means including yielding spring means for urging said claw means out of engagement with said film, an electromagnet for moving said claw means into engagement with said film, said electromagnet being arranged in an electric circuit, a selector switch in said circuit adapted to selectively connect said electromagnet with one of a plurality of circuits each of which contains a normally open control switch, a cam carrying drum which is operated by said motor driven shaft, said cam carrying drum being provided with a plurality of series of circumferentially spaced cams arranged one series next to the other, one of each of said control switches being positioned adjacent said series of cams to be closed thereby when said cams engage said switches whereby one series of cams at a time is selected by said selector switch to be connected with its associated control switch in said circuit of said electro-magnet, each said series of cams contains a different number of cams.

5. A device according to claim 1, in which said claw means comprises a longitudinal member pivotally supported at one end on each of said pivoted levers and having a tooth at the other end for engaging within a perforation in the film edge, a lateral projection on said longitudinal member engageable with said lever arm, an armature plate for said electromagnet connected with said lever arm adapted to be attracted by said electromagnet when the latter is energized so as to permit the tooth on said member to enter said perforation, and spring means for moving said lever arm into a position in which said longitudinal member is raised whereby its tooth is moved away from the film when said electromagnet is de-energized, said armature plate being located in spaced relation from said electromagnet when fully attracted by said energized electromagnet.

6. In a device for controlling the image frequency during the projection of a motion picture film, claw means adapted to be moved periodically lengthwise of the film and to be moved selectively perpendicular with respect to said film for entering into a perforation of said film during selected longitudinal movements of the same, motor driven shaft means, a pivoted guide lever arranged to swing in the same plane as said film to which said claw means is pivotally attached, a cam on said shaft means engageable with said guide lever for moving said claw means periodically in a direction lengthwise of said film, a lever arm engageable with said claw means for periodically moving said claw means into and out of engagement with a perforation of said film, an electromagnet arranged in an electric circuit having a source of electrical energy for actuating said lever arm, said electromagnet circuit including a series of simple selector circuits, a selector switch connected with each one of said selector circuits, a control switch connected to each of said selector circuits and disposed in a normally open position, a commutator provided with a plurality of segments on each commutator ring for periodically closing the circuit through said electro-magnet, whereby a selected position of said selector switch will place one of said normally open periodic switches in circuit with said electro-magnet so that when the periodic switch is closed by the segments on said commutator ring the electromagnet will be energized from said source of electrical energy, and gear means drivingly connected with said motor driven shaft for rotating said commutator.

*7. An intermittent film feeding mechanism for a film projector, comprising:*

*a film claw;*

*means for effecting continuous reciprocating motion of said film claw back and forth along the film;*

*electrically actuatable means effective upon actuation thereof for moving said film claw into and out of engagement with the film in synchronism with the back and forth movement of said film claw to thereby advance film through the projector;*

*a rotatable member having a plurality of different series of cam projections; and*

*means including switch means actuated by said series of cam projections for selectively rendering said electrically actuatable means operative to move said film claw into and out of engagement with the film at a plurality of different frequencies.*

*8. An intermittent film feeding mechanism as defined in claim 7, wherein said electrically actuatable means comprises an electro-magnet.*

*9. An intermittent film feeding mechanism for a film projector, comprising:*

*a film claw;*

*means for effecting continuous reciprocating motion of said film claw back and forth along the film;*

*electrically actuatable means effective upon actuation thereof for moving said film claw into and out of engagement with the film in synchronism with the back and forth movement of said film claw for advancing the film; and*

*electrical switch means including a rotatable member having a plurality of different series of conductive segments and at least one brush contact coacting with said series of segments for selectively actuating said electrically actuatable means to move said film claw into and out of engagement with the film at a plurality of different frequencies.*

*10. An intermittent film feeding mechanism as defined in claim 9, wherein said electrically actuatable means comprises an electro-magnet.*

*11. An intermittent film feeding mechanism for a film projector, comprising:*

*a film claw;*

*means for effecting continuous reciprocating motion of said film claw back and forth in a path generally parallel to the longitudinal axis of the film;*

*electromagnetic means effective upon energization thereof for moving said film claw into and out of engagement with the film in synchronism with the back and forth movement of said film claw for advancing the film;*

*means including a plurality of electrical switch means for energizing said electromagnetic means at a plurality of different frequencies respectively; and*

*means for rendering selected ones of said plurality of switch means operative to control energization of said electro-magnet.*

*12. An intermittent film feeding mechanism as defined in claim 11, wherein said means for energizing said electro-magnet includes a rotatable member having a plurality of different series of cam projections for actuating said electrical switch means between open and closed positions at different frequencies, and wherein said means for rendering selected ones of said switch means operative to control energization of said electro-magnetic means comprises a selector switch for selectively connecting said switch means in an electrical circuit with said electro-magnetic means.*

*13. An intermittent film feeding mechanism as defined in claim 11, wherein said means for energizing said electro-magnet includes a rotatable member having a plurality of brush contacts coacting with said different series of segments respectively, and wherein said means for selectively rendering selected ones of said switch means operative comprises a selector switch for selectively connecting said brush contacts in an electric circuit with said electro-magnetic means.*

14. An intermittent film feeding mechanism for a film projector, comprising:

a film claw;

means for effecting continuous reciprocating back and forth motion of said film claw along the film at a predetermined rate;

electro-magnetic means effective upon energization thereof to move said film claw into and out of engagement with the film in synchronism with the back and forth movement of said film claw for advancing the film;

means including a plurality of electrical switch means for energizing said electro-magnetic means at a pulrality of different frequencies respectively; and means for remotely rendering selected ones of said plurality of switch means operative to control energization of said electro-magnetic means.

15. An intermittent film feeding mechanism as defined in claim 14, wherein the last said means comprises a manually operative selector switch means for selectivtly connecting said plurality of switch means to control energization of said electro-magnetic means.

16. An intermittent film feeding mechanism as defined in claim 15, wherein said means including a plurality of electrical switch means comprises a rotatable member having a plurality of different series of cam projections for actuating said electrical switch means between open and closed positions at said plurality of different frequencies.

17. An intermittent film feeding mechanism as defined in claim 15, wherein said means for energizing said electro-magnetic means comprises a rotatable member having a plurality of different series of conductive segments and a plurality of contacts coacting with said series of segments respectively.

18. An intermittent film feeding mechanism for a film projector having a voltage source, comprising:

a film claw;

means for effecting continuous back and forth movement of said film claw along the film;

an electro-magnet effective upon energizing thereof for moving said film claw into and out of engagement with the film in synchronism with back and forth movement of said film claw for advancing the film;

means including a plurality of electrical switch means for energizing said electro-magnet at a plurality of different frequencies respectively; and selector switch means for selectively connecting said switch means in series with said electro-magnet and the source to effect energization of said electro-magnet at selected ones of said frequencies.

19. An intermittent film feeding mechanism as defined in claim 18, wherein said means including a plurality of electrical switch means comprises a rotatable member having a plurality of different series of cam projections for opening and closing said plurality of electrical switch means at different frequencies and said selector switch means comprises a selector switch.

20. An intermittent film feeding mechanism as defined in claim 18, wherein said means including a plurality of electrical switch means comprises a rotatable member having a plurality of different series of conductive segments and a plurality of contacts coacting with said segments, and said selector switch means comprises a selector switch.

21. In a device for controlling the image frequency during the projection of a motion picture film, claw means adapted to be moved periodically lengthwise of the film and to be moved selectively perpendicular with respect to said film for entering into a perforation of said film during selected longitudinal movements of the same, motor driven shaft means, a cam on said shaft means for moving said claw means periodically in a direction lengthwise of said film, an electromagnet arranged in an electric circuit having a source of electrical energy for actuating and moving said claw means into and out of engagement with a perforation of said film, said electro-magnet being connected selectively to a selector switch in said circuit, a plurality of circuits for said selector switch each of which contains a normally open control switch, a cam carrying drum having a series of circumferentially spaced members engageable with said control switches for closing one of said control switches periodically, said cam carrying drum being operated by said motor driven shaft means.

References Cited

The following references, cited by the Examiner, are of record in the patented file of this patent or the original patent.

UNITED STATES PATENTS

| | | | |
|---|---|---|---|
| 1,950,692 | 3/1934 | Owen | 226—49 |
| 2,567,499 | 9/1951 | Vaughn | 226—49 X |
| 2,588,813 | 3/1952 | Dube | 352—173 |
| 2,772,325 | 11/1956 | Gaite | 226—62 X |

FOREIGN PATENTS

| | | |
|---|---|---|
| 812,020 | 4/1959 | Great Britain. |

ALLEN N. KNOWLES, *Primary Examiner.*

M. HENSON WOOD, Jr., *Examiner.*